Oct. 11, 1966 F. J. THURSTON ET AL 3,277,996
ARTICLE HANDLING APPARATUS
Filed April 3, 1964 2 Sheets-Sheet 1

INVENTORS
FRANKLIN J. THURSTON
ROBERT V. SANWALD
BY Pennie, Edmonds, Morton, Taylor and Adams
ATTORNEYS

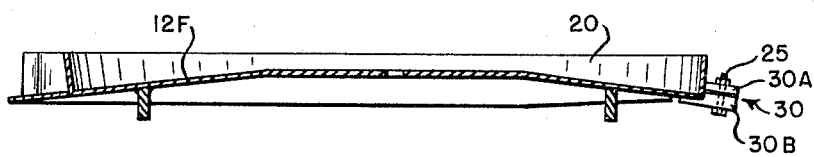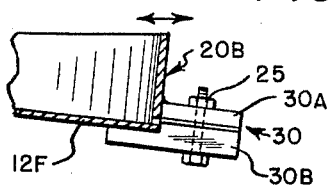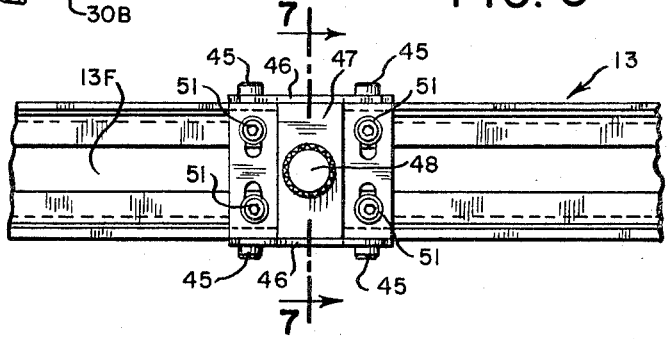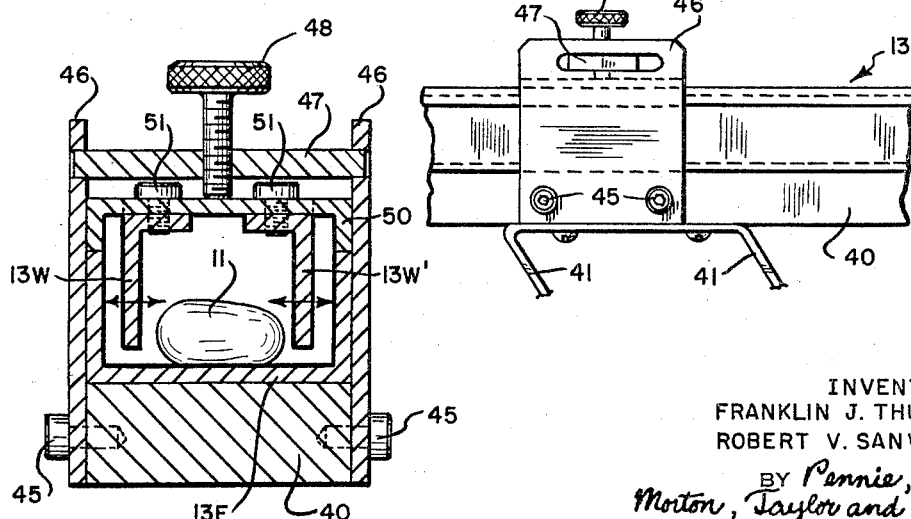

United States Patent Office 3,277,996
Patented Oct. 11, 1966

3,277,996
ARTICLE HANDLING APPARATUS
Franklin J. Thurston, Bethesda, and Robert V. Sanwald, Burtonsville, Md., assignors, by mesne assignments, to GBL Corporation, Washington, D.C., a corporation of Maryland
Filed Apr. 3, 1964, Ser. No. 357,055
7 Claims. (Cl. 198—33)

The present invention relates generally to article handling devices and more particularly to vibratory type article feeding devices, which are adapted to receive randomly positioned articles at an input station and serially deliver each article through an output delivery chute in a predetermined oriented position.

A variety of vibratory type parts feeding devices have been proposed in the prior art for automatically delivering specifically shaped articles in predetermined oriented positions to receiving stations on automatic assembly production lines and the like. Conventional vibratory type feeder devices ordinarily include a hopper bowl which is mounted on a compliant support operatively associated with an electromagnetic vibratory motor which is adapted to reciprocally vibrate the article loaded hopper at a repetition rate corresponding to the natural mechanical resonant frequency of the assembly. A continuous spiral shaped shelf-track is normally provided along the inner wall surface of the hopper in order to convey articles from the bottom floor upwardly to an output discharge station disposed near the upper peripheral edge of the hopper. Depending upon the shape of the articles to be oriented and delivered by the particular feeder device, the shelf-track may be slotted, altered in width or slope or general contour, and cooperating wiper-blade or profile elements may be mounted adjacent the conveyer track to effect the desired orientation of parts.

Whereas such prior art devices have been found to function well in applications calling for the delivery of many different types of hardware articles, the abrasion and severe tumbling action produced by articles falling from the shelf-tracks and the like has made the use of these prior art devices unsuitable for the delivery of soft-wear articles such as, for example, soft coated candies and the like.

It is a principal object of the present invention to provide an improved vibratory type article feeder device which is capable of rapidly and efficiently delivering articles having soft surfaces such as chocolate coated candies and the like without discoloring or marring the delicate surfaces thereof.

It is a further object of the present invention to provide an improved vibratory type bowl feeder, which effects delivery of oriented articles to an output chute exiting through a sidewall without the use of a spiral shelf-track.

In accordance with the invention, a three stage article feeding device is provided which includes a platform type supply input feeder, an intermediate bowl type article orienting feeder, and a cooperating chute type delivery feeder. The bowl feeder features a simplified bowl construction wherein the radius of an orienting peripheral wall is gradually reduced in the direction of article travel between input and output so as to effect rapid and efficient orientation of elongate articles. The bottom floor of the bowl is sloped outwardly towards the peripheral wall so that all articles supplied from a flat platform feeder through an opening in the side wall are caused to move towards the wall as they are advanced to the output delivery chute.

Delivery of articles to the vibratory output chute is effected through a second cutout in the bowl wall disposed approximately 180° from the input station. In accordance with a further aspect of the invention, provisions are made for adjusting the input width of the chute so that improperly oriented elongate articles are caused to tip off the rail and move back toward the input delivery station. Interference between these returned articles and newly arrived articles is prevented by a second wall section, the radius of which is also gradually reduced to move the returned articles upwardly towards the bowl center and away from the input flow path.

In a preferred embodiment of the invention, all surfaces with which articles come in contact are coated with polished Teflon to reduce friction and thus reduce marring and discoloring of soft surfaced articles.

Other objects and advantages of the invention will be pointed out in the following description and claims and illustrated in the accompanying drawings, which disclose a preferred embodiment thereof.

In the drawings:

FIG. 3 is a sectional view of the bowl feeder, shown in FIG. 2;

FIG. 4 is a partial sectional view of the adjustable feeder bowl wall shown in FIG. 2;

FIG. 5 is an enlarged fragmentary plan view of the variable width vibratory delivery chute shown in FIGS. 1 and 2;

FIG. 6 is a fragmentary elevation view of the delivery chute shown in FIG. 5; and FIG. 7 is an enlarged cross sectional view of the delivery chute shown in FIG. 5.

For purposes of explaining the operational features of the present invention, the operation of a preferred embodiment is described and illustrated in an application for feeding chocolate covered candies to automatic packing apparatus. It will be understood, however, that the present invention is in no way limited to this specific application.

Figure 1:
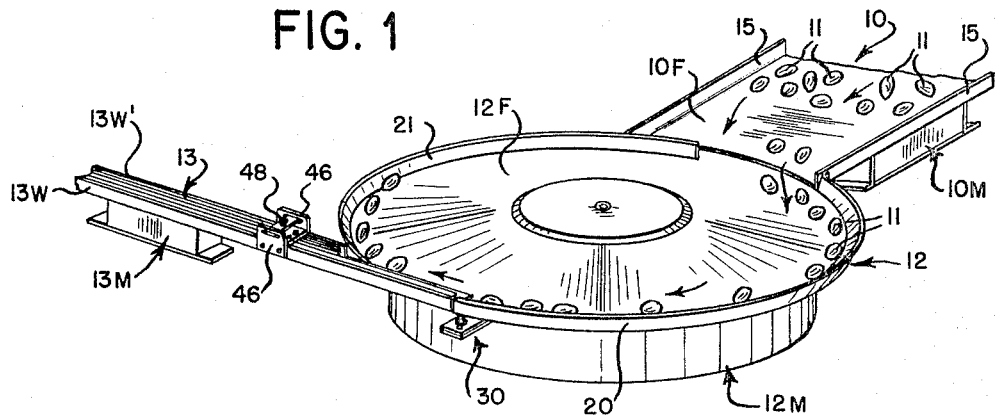
FIG. 1 is a perspective view of the article handling apparatus provided by the invention.

Referring to FIG. 1, there is illustrated in perspective view a platform supply feeder 10 provided to deliver randomly oriented candies 11 to a vibratory type bowl feeder 12 as illustrated. Bowl feeder 12, by virtue of its unique structural features, is in turn adapted to deliver properly oriented candies 11a to the output vibratory chute 13 which is provided to transfer properly oriented candies to an automatic packing machine or the like. Each of the cooperating feeders 10, 12 and 13 is preferably driven by its own independent vibratory driver motor 10M, 12M and 13M respectively. Each of these motors is adapted to develop the necessary vertical and horizontal components of vibration to cause the candies 11 to move in the direction indicated by the arrows in FIGS. 1 and 2. Such vibratory driver units are well known in the art and since they form no part of the present invention, no further description of their operation will be provided herein.

Figure 2:
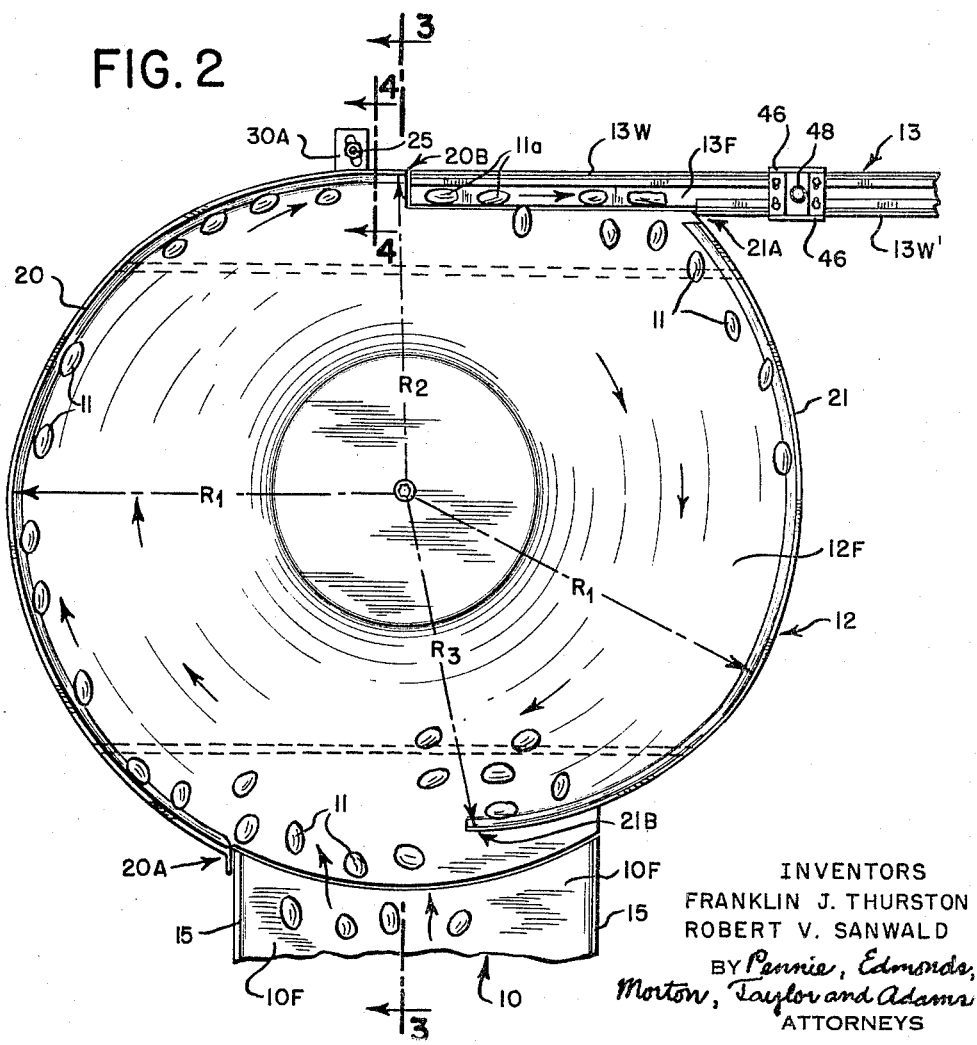
FIG. 2 is an enlarged plan view of the vibratory feeder apparatus shown in FIG. 1.

As illustrated in FIG. 2, sufficient clearance is provided between each of the feeder units 10, 12 and 13 so that interference between these separately driven units is avoided. At the same time, the clearance gap is sufficiently small so that the candy articles are easily transferred from one feeder unit to the next across the small clearance gaps.

In operation, the candy articles are rapidly and efficiently delivered to the surface of platform feeder 10 on a flat sheet or tray that is readily received between the side walls 15. The thin flat sheet is then simply withdrawn by the operator and the candies are deposited on the surface of platform 10 with a minimum amount of tumbling action. From the surface 10F of platform feeder 10, the candy articles are delivered to the outwardly and downwardly sloping floor surface 12F of bowl feeder 12. As illustrated, the outer periphery of the bowl feeder is defined by a variable radius orienting wall 20 and a variable radius article return wall 21. The input end 20A of wall 20 is separated from the output end 21B of wall 21 to provide for input delivery of randomly oriented articles. In like manner the output end 20B of wall 20 is separated from the input end 21A of wall 21 to provide for output delivery of oriented articles to feeder 13.

In accordance with a featured aspect of the present invention, the radius of wall 20 is gradually and continuously diminished in the direction of article travel. This reduction in wall radius in combination with the outwardly and downwardly sloping floor surface 12F causes each of the candy articles 11 to move into contact with the inner surface of wall 20 in advancing towards output delivery chute 13. Oblong or elongate candies are thereby effectively oriented so that the longer axis is aligned with the direction of travel and the desired orientation of candy articles delivered to chute 13 is very efficiently and rapidly effected.

By way of example it may be noted that in a typical 24 inch diameter bowl constructed in accordance with the present invention, the nominal radius $R_1$ of 12 inches is reduced to a value $R_2$ of approximately 9½ inches within an arc of approximately 90° as illustrated in FIG. 2.

As illustrated in the plan view of FIG. 2, a gap is provided between the wall ends 20B and 21A and the floor section therebetween is notched out to receive the input end of vibratory chute 13 as illustrated.

In accordance with a further aspect of the invention, provisions are made for varying the radius of 20B, by adjustment of the clamp 25 so that the terminal end 20B of wall 20 is accurately aligned with the outer wall 13W of chute 13.

As shown in FIG. 4, the end section of 20B of wall 20 is preferably undercut so that it can be moved with respect to the bottom floor and thereby be aligned with wall 13W. Wall end 20B is maintained in a predetermined desired position by clamp 30 comprising an upper section 30A welded to the wall segment 20B and a lower segment 30B affixed to the bottom of the bowl floor 12F. Clamp segment 30A preferably includes a slot as shown in FIG. 2 that permits movement of the wall inwardly and outwardly when clamp bolt 25 is loose; wall 20B is maintained in its desired position by tightening clamp bolt 25.

It is generally recognized that one of the major problems which confronts the operator of automated machinery for handling articles of food is that of maintaining the machinery in a clean and sanitary condition. In accordance with the present invention, each of the individual cooperating feeder devices 10, 12 and 13 is constructed and mounted on independent vibratory drive supports so that each may be readily removed for sterilization. To simplify the cleaning or sterilization process and to minimize scratching or marring of the delicate candy surfaces and the like, each of the floor surfaces 10F, 12F and 13F, as well as the inner wall surfaces of each feeder, are coated with a thin layer of plastic, preferably Teflon. Following conventional coating processes, metal surfaces (e.g. aluminum) are coated with a bonding agent, spray coated with Teflon and the coating is then heat cured at a temperature of approximately 750° F. The thin coating of Teflon (e.g. 0.003 inch) is then polished to provide a very low friction surface which may be readily sterilized. In addition to improving the feed rate efficiency, the Teflon coating additionally eliminates scratching or marring of the candy surfaces.

In normal operation, the width between walls 13W and 13W' is adjusted, as will be described more fully hereinafter, to receive and accommodate the maximum width of properly oriented candies to be delivered down the chute to an assembly station not shown. Oblong candies that are not properly oriented are shaken off the floor 13F of chute 13 and back onto the floor 12F of the vibratory bowl feeder 12. These improperly oriented candies are caused to travel in a clockwise direction as illustrated in FIG. 2 back towards the input station supplied by feeder 10. In accordance with a further aspect of the invention, the radius of wall 21 is gradually diminished from a nominal value $R_1$ to a value $R_3$ as shown. In a typical bowl having a nominal radius of 12 inches, a satisfactory value for $R_3$ has been found to be approximately 10 inches. As illustrated, this change is preferably made in a gradual manner to effect the smooth redirection of the returned candies in a path such that there will be no interference between those articles and the newly delivered articles from platform feeder 10.

Various structural features of the vibratory article output feeder 13 will now be described with reference to FIGS. 5–7. The entire trough feeder is supported on a relatively thick and rigid base member 40 which is in turn coupled to a vibratory drive motor at periodic intervals through compliant support members 41. Supported on the base member 40 is a U shaped chute member 13F which is securely held in place by a plurality of quick-release clamps that are secured to the base rail 40 by machine screws 45. Each clamp comprises a pair of clamp side members 46 slotted at the top to receive a removable cross bar member 47 which is threaded to receive a knurled hand actuated clamp screw 48. Side rails 13W and 13W' are supported from chute clamp 50 by machine screws 51. In accordance with one aspect of the invention, the spacing between 13W and 13W' may easily be adjusted by transverse displacement of the machine screws 51 in the slotted holes provided in clamp chute 50. The inside surfaces of side rails 13W and 13W' are preferably coated with Teflon as are the bottom and side surfaces of chute 13F.

The entire chute assembly may readily be disassembled for sterilization by releasing the pressure brought to bear against the top of chute clamp 50 by 48. When the pressure is released by unscrewing 48, the entire cross bar 47 on each clamp assembly may be turned and removed from the slots in 46 thereby making it possible to remove the entire chute, chute clamp and side wall assembly.

From the foregoing description of a preferred embodiment of the invention, it will be clear to those skilled in the art that the article handling apparatus provided by the present invention affords a relatively simple, versatile and efficient means for feeding candy articles or the like with a minimum amount of damage and discoloration due to abrasion and tumbling action.

While a preferred embodiment of the invention has been described, it will be apparent to those skilled in the art that modifications may be made within the scope of the invention as defined by the appended claims.

We claim:
1. An article handling hopper bowl adapted to be reciprocally driven along a central axis of vibration on a compliant support by a vibratory motor to automatically deliver articles in position oriented sequence, said hopper bowl having an outwardly sloping conical floor, an article orienting wall segment having an input end and an output end and being attached to a portion of the outer peripheral edge of said floor, the radius of curvature of said orienting wall with respect to said central axis of vibration being less at the output end than the input end, an article return wall segment having an input end and an output end and being attached to a portion of the outer peripheral edge of said floor, the radius of curvature of said article return wall with respect to said central axis of vibration being less at the output end than the input end.

an article receiving station disposed between the input end of said orienting wall and the output end of said article return wall, and an article delivery station disposed between the output end of said orienting wall and the input end of said article return wall.

2. An article handling hopper bowl in accordance with claim 1 wherein means are provided to variably adjust the radius of the output end of said orienting wall segment.

3. An article handling hopper bowl in accordance with claim 1 characterized in that the floor surface and the inner surfaces of said orienting and article return walls are coated with a thin layer of plastic.

4. Article handling apparatus including an article handling hopper bowl adapted to be reciprocally driven along a central axis of vibration on a compliant support by a vibratory motor to automatically deliver articles in position oriented sequence, said hopper bowl having an outwardly sloping conical floor, an article orienting wall segment having an input end and an output end and being attached to a portion of the outer peripheral edge of said floor, the radius of curvature of said orienting wall with respect to said central of axis of vibration being less at the output end than at the input end, an article return wall segment having an input end and an output end and being attached to a portion of the outer peripheral edge of said floor, the radius of curvature of said article return wall with respect to said central axis of vibration being less at the output end than at the input end, an article receiving station disposed between the input end of said orienting wall and the output end of said article return wall, a vibratory feeder for delivering articles to said receiving station, said apparatus comprising a channel shaped platform having an open input end for receiving articles and an open output end adapted to be mounted adjacent said receiving station whereby articles supplied to said platform are delivered between the respective input and output ends of said orienting and articles return walls to the floor surface of the hopper bowl, and an articles delivery station disposed between the output end of said orienting wall and the input end off said article return wall.

5. Article handling apparatus including an article handling hopper bowl adapted to be reciprocally driven along a central axis of vibration on a compliant support by a vibratory motor to automatically deliver articles in position oriented sequence, said hopper bowl having an outwardly sloping conical floor, an article orienting wall segment having an input end and an output end and being attached to a portion of the outer peripheral edge of said floor, the radius of curvature of said orienting wall with respect to said central axis of vibration being less at the output end than the input end, an article return wall segment having an input end and an output end and being attached to a portion of the outer peripheral edge of said floor, the radius of curvature of said article return wall with respect to said central axis of vibration being less at the output end than at the input end, an article receiving station disposed between the input end of said orienting wall and the output end of said article return wall, an article delivery station disposed between the output end of said orienting wall and the input end of said article return wall, and an vibratory chute feeder for transferring oriented articles from said receiving station to an assembly station, said chute feeder having an outer sidewall the input end of which is adapted to be mounted in spaced adjacent relationship with the output end of said orienting wall and an inner sidewall the input end of which is adapted to be mounted in spaced adjacent relationship with the input end of said article return wall.

6. Article handling apparatus including an article handling hopper bowl adapted to be reciprocally driven along a central axis of vibration on a compliant support by a vibratory motor to automatically deliver articles in position oriented sequence, said hopper bowl having an outwardly sloping conical floor, an article orienting wall segment having an input end and an output end and being attached to a portion of the outer peripheral edge of said floor, the radius of curvature of said orienting wall with respect to said central axis of vibration being less at the output end than the input end, an article return wall segment having an input end and an output end and being attached to a portion of the outer peripheral edge of said floor, the radius of curvature of said article return wall with respect to said central axis of vibration being less at the output end than the input end, an article receiving station disposed between the input end of said orienting wall and the output end of said article return wall, an article delivery station disposed between the output end of said orienting wall and the input end of said article return wall, a vibratory feeder for delivering articles to said receiving station, said apparatus comprising a channel shaped platform having an open input end for receiving articles and an open output end adapted to be mounted adjacent said receiving station whereby articles supplied to said platform are delivered between the respective input and output ends of said orienting and article return walls to the floor surface of the hopper bowl, and a vibratory chute feeder for transferring oriented articles from said receiving station to an assembly station, said chute feeder having an outer sidewall the input end of which is adapted to be mounted in spaced adjacent relationship with the output end of said orienting wall and an inner sidewall the input end of which is adapted to be mounted in spaced adjacent relationship with the input end of said article return wall.

7. Article handling apparatus in accordance with claim 6 characterized in that the floor and inner wall surfaces of the hopper bowl, the platform and the rail feeders are coated with a thin layer of plastic.

References Cited by the Examiner

UNITED STATES PATENTS

| | | |
|---|---|---|
| 2,332,600 | 10/1943 | Rapp. |
| 2,336,561 | 12/1943 | Muskat. |
| 2,468,290 | 4/1949 | Carter _____ 198—30 |
| 3,115,233 | 12/1963 | Dick. |
| 3,123,251 | 3/1964 | Schneider _____ 198—33 X |
| 3,147,841 | 9/1964 | Austin. |
| 3,224,554 | 12/1965 | Moulder _____ 198—33 |

FOREIGN PATENTS 841,093   7/1960   Great Britain.

MARVIN A. CHAMPION, *Primary Examiner.*

EDWARD A. SROKA, *Examiner.*